United States Patent
Schlesser et al.

(10) Patent No.: US 6,880,317 B2
(45) Date of Patent: Apr. 19, 2005

(54) HYDRAULIC SYSTEM FOR AN AGRICULTURAL MOWER

(75) Inventors: Walter Mark Schlesser, Ottumwa, IA (US); Timothy J. Krauss, Hedrick, IA (US)

(73) Assignee: Deere & Company, Moline, IL (US)

( * ) Notice: Subject to any disclaimer, the term of this patent is extended or adjusted under 35 U.S.C. 154(b) by 193 days.

(21) Appl. No.: 10/154,197

(22) Filed: May 22, 2002

(65) Prior Publication Data

US 2003/0230064 A1 Dec. 18, 2003

(51) Int. Cl.$^7$ .............................................. A01D 34/00
(52) U.S. Cl. ...................................... 56/11.9; 56/14.9
(58) Field of Search ................... 56/10.9, 11.9, 56/14.9, DIG. 11; 172/2, 4, 7, 8, 10, 11; 91/170 R, 174; 92/85 R, 85 A, 85 B, 130 R, 131, 132, 133, 130 C, 130 D

(56) References Cited

U.S. PATENT DOCUMENTS

| | | | | |
|---|---|---|---|---|
| 3,464,190 A | * | 9/1969 | Barrett et al. | 56/10.2 R |
| 3,548,570 A | * | 12/1970 | Suggs et al. | 56/10.2 R |
| 4,359,101 A | * | 11/1982 | Gagnon | 172/38 |
| 4,956,965 A | * | 9/1990 | Parsons, Jr. | 56/15.1 |
| 5,022,219 A | * | 6/1991 | Knurr et al. | 56/16.4 R |
| 5,727,371 A | * | 3/1998 | Kieffer et al. | 56/6 |
| 5,901,533 A | * | 5/1999 | Ermacora et al. | 56/6 |
| 6,128,892 A | * | 10/2000 | Neuerburg et al. | 56/6 |
| 6,311,464 B1 | * | 11/2001 | Neuerburg et al. | 56/15.2 |
| 2002/0017090 A1 | | 2/2002 | Hockenbeck | |

FOREIGN PATENT DOCUMENTS

| | | | |
|---|---|---|---|
| DE | 885 016 | 7/1953 | |
| DE | 100 10 548 C | 2/2001 | |
| EP | 0882386 A2 | 12/1998 | .......... A01D/34/66 |
| EP | 1 051 895 A2 | 5/2000 | |
| WO | WO 86 07521 | 12/1986 | |
| WO | 95/01715 | 1/1995 | .......... A01D/34/66 |

* cited by examiner

*Primary Examiner*—Robert E. Pezzuto
*Assistant Examiner*—Nathan Mammen
(74) *Attorney, Agent, or Firm*—Taylor & Aust, P.C.

(57) ABSTRACT

A hydraulic system has a frame member having an end. The structural member is pivotally coupled with the frame member end. A first hydraulic cylinder includes a cylinder housing, a ram with a head reciprocally disposed within the housing, a first chamber on one side of the head, and a second chamber on another side of the head. A first end of the first hydraulic cylinder is attached to the frame member. A preload spring has a first end which is attached to the frame member, and a second end which is attached to the second end of the first hydraulic cylinder. A second hydraulic cylinder is coupled between the frame member and the structural member. The second hydraulic cylinder includes a cylinder housing, a ram with a head reciprocally disposed within the housing, a first chamber on one side of the head and a second chamber on another side of the head. A first fluid line interconnects the first chamber of the first and second hydraulic cylinders. A second fluid line interconnects the second chamber of the first and second hydraulic cylinders.

19 Claims, 2 Drawing Sheets

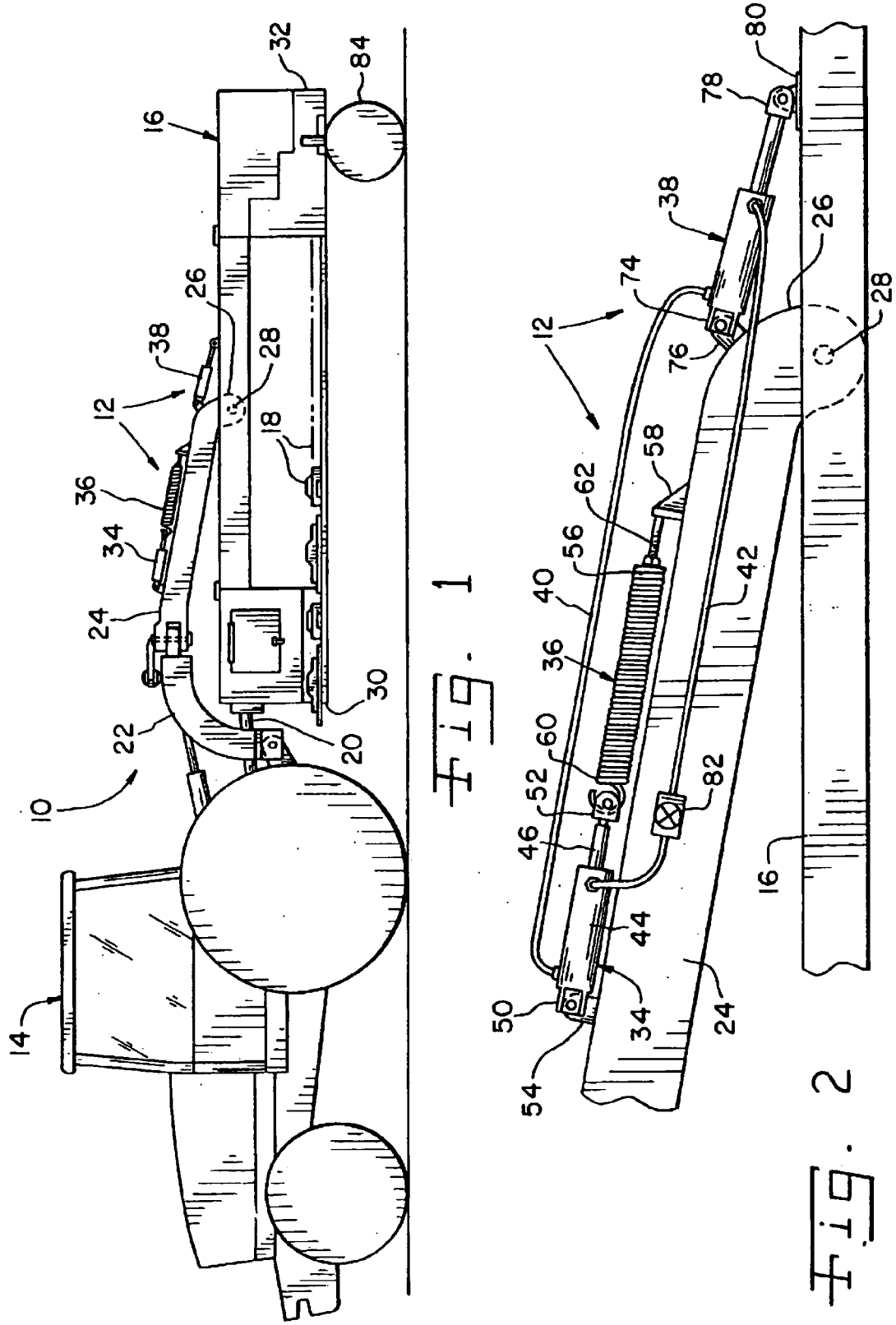

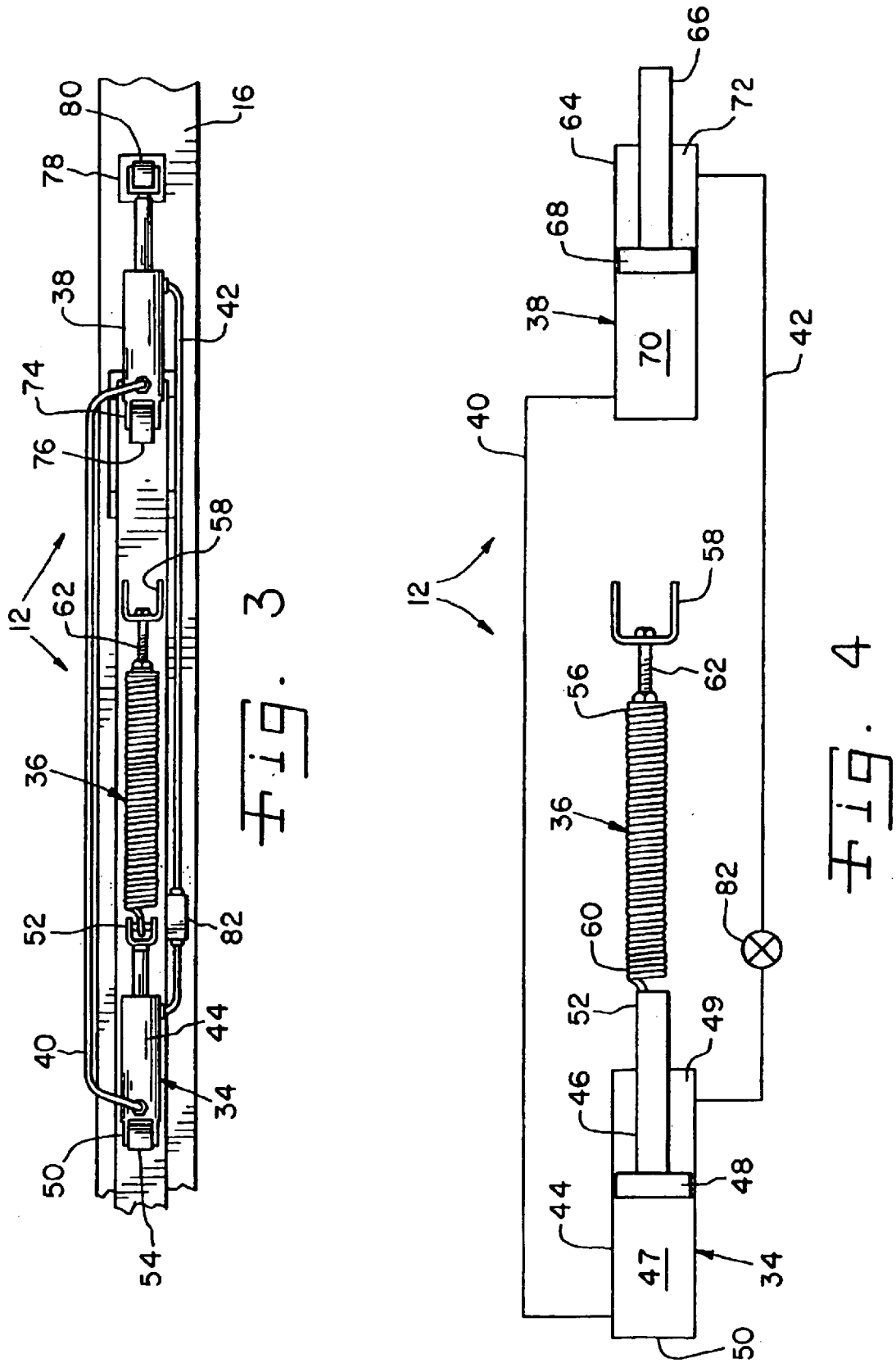

US 6,880,317 B2

HYDRAULIC SYSTEM FOR AN AGRICULTURAL MOWER

FIELD OF THE INVENTION

The present invention relates to hydraulic systems, and, more particularly, to hydraulic systems used to position one structural member relative to another.

BACKGROUND OF THE INVENTION

A hydraulic system for an agricultural application typically includes one or more hydraulic cylinders which receive pressurized hydraulic fluid from a pressure source, such as a hydraulic pump within an agricultural tractor. In the case of a single cylinder, the hydraulic cylinder includes a pair of fluid lines which are in communication with chambers on respective sides of a piston attached to a ram. The fluid lines are coupled with a dual outlet hydraulic bank located at the back of the tractor and operated from within the cab. In the case of multiple hydraulic cylinders coupled together, each of the cylinders receive pressurized fluid in a parallel or series manner, depending upon the particular application. Hydraulic cylinders of this type are generally useful for lifting heavy loads and the like.

It is also possible to balance a load such as a structural member pivotally connected to another frame member through the use of springs, counter weights, etc. In the case of springs, one or more springs may be placed between the load to be balanced and the pivotally coupled frame member on opposite sides of the pivot location to keep the load in a generally centered orientation relative to the frame member. Spring configurations of this type may be suitable for balancing loads, but may also be bulky and impractical in terms of space requirements. Further, such spring arrangements offer some resistance to relative movement between the structural members, but do not prevent movement therebetween.

What is needed in the art is a hydraulic system which can be used, e.g., with an agricultural mower, and provides the dual functionality of both balancing as well as locking a load relative to a frame member.

SUMMARY OF THE INVENTION

The present invention provides a hydraulic system which balances and locks a position of a frame member relative to a structural member such as a cutter head of an agricultural mower.

The invention comprises, in one form thereof, a hydraulic system including a frame member having an end. The structural member is pivotally coupled with the frame member end. A first hydraulic cylinder includes a cylinder housing, a ram with a head reciprocally disposed within the housing, a first chamber on one side of the head, and a second chamber on another side of the head. A first end of the first hydraulic cylinder is attached to the frame member. A preload or counterbalance spring has a first end which is attached to the frame member, and a second end which is attached to the second end of the first hydraulic cylinder. A second hydraulic cylinder is coupled between the frame member and the structural member. The second hydraulic cylinder includes a cylinder housing, a ram with a head reciprocally disposed within the housing, a first chamber on one side of the head and a second chamber on another side of the head. A first fluid line interconnects the first chamber of the first and second hydraulic cylinders. A second fluid line interconnects the second chamber of the first and second hydraulic cylinders. In an alternate form of the invention, the spring could be coupled between the frame member and the structural member.

An advantage of the present invention is that the structural member, such as a cutter head of an agricultural mower, is balanced relative to the frame member without the use of sophisticated and relatively expensive sensors and controls.

Another advantage is that the position of the structural member relative to the frame member may be selectively locked.

Yet another advantage is that the preload on the first hydraulic cylinder may be selectively adjusted.

Still another advantage is that the cylinders act to dampen relative movement that occurs between the structural and frame members due to loads induced on the cutting head during operation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a side view of an agricultural mower including an embodiment of a hydraulic system of the present invention;

FIG. 2 is a fragmentary, side view of the hydraulic system of the present invention shown in FIG. 1;

FIG. 3 is a top view of the hydraulic system shown in FIGS. 1 and 2; and

FIG. 4 is a schematic illustration of the hydraulic system shown in FIGS. 1–3.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENT

Referring now to the drawings, and more particularly to FIG. 1, there is shown an agricultural mower 10 which includes an embodiment of a hydraulic system 12 of the present invention. Agricultural mower 10 generally includes a traction unit 14 and a pair of cutter heads 16, one of which is shown in FIG. 1 in the folded, transport position generally in line with traction unit 14. Cutter head 16 includes a rotary disk cutterbar 18 which is driven by a telscoping drive shaft 20 extending between a source of power located on the traction unit 14. An agricultural mower having a rotary disk cutterbar is generally known, and therefore will not be described in greater detail herein. For example, the assignee of the present invention markets a model No. 956 mower-conditioner with a rotary disk cutterbar.

Agricultural mower 10 also includes a 3-point hitch assembly 22 which pivotally supports a frame member 24 in the form of a cantilever beam. Frame member 24 includes a proximal end which is pivotally coupled with 3-point hitch assembly 22 and a distal end 26 which is pivotally coupled with cutter head 16 at pivot point 28, which defines an axis that is oriented in a direction of travel during the operation of implement 10. Cutter head 16 defines a structural member 16, also known as an elongate frame 16, supporting rotary disk cutterbar 18, and includes a proximal end 30 and distal end 32 (relative to 3-point hitch assembly 22). Distal end 26 of frame member 24 is pivotally coupled with the structural member or cutter head 16 at a location approximately midway, also known as a central region, between proximal end 30 and distal end 32.

Referring now to FIGS. 2–4, hydraulic system 12 will be described in greater detail. Hydraulic system 12 functions to balance cutter head 16 relative to frame member 24, and selectively lock the position of cutter head 16 relative to frame member 24. In general, hydraulic system 12 includes a first hydraulic cylinder 34, preload or counterbalance spring 36, second hydraulic cylinder 38, first fluid line 40 and second fluid line 42.

First hydraulic cylinder 34, shown schematically in FIG. 4, includes a cylinder housing 44. A ram 46 with a head 48 is reciprocally disposed within cylinder housing 44. Cylinder housing 44 defines a variable volume first chamber 47 on a side of head 48 which is opposite from ram 46. Cylinder housing 44 also defines a variable volume second chamber 49 on a side of head 48 which is adjacent to ram 46. A first end 50 of first hydraulic cylinder 34 is positioned at an end of cylinder housing 44; and a second end 52 of first hydraulic cylinder 34 is positioned at an end of ram 46 opposite from head 48. First end 50 is attached to a flange 54 extending from frame member 24.

Preload spring 36 includes a first end 56 which is attached to a flange 58 extending from frame member 24. Preload spring 36 also includes a second end 60 which is attached to second end 52 of first hydraulic cylinder 34. In the embodiment shown, preload spring 36 is a tension spring, but could be a compression spring depending on the spring characteristics needed for applying a selected axial preload to ram 46 of first hydraulic cylinder 34 in a required direction, for the purpose explained in more detail below. To couple first end 56 of spring 36 with flange 58, an adjustable preload member 62 in the form of a mechanically adjustable threaded bolt interconnects first end 56 with flange 58. The degree to which bolt 62 is threaded into a suitable coupling at first end 56 determines the preload applied to spring 36 and hydraulic ram 46. An electrically or hydraulically driven actuator could also be used to adjust preload member 62. Also, instead of being coupled to the hydraulic cylinder 34, the spring 36 could be mounted between the frame member 24 and the cutter head 16.

Second hydraulic cylinder 38 is coupled between frame member 24 and cutter head 16. Second hydraulic cylinder 38 includes a cylinder housing 64 (FIG. 4). A ram 66 with a head 68 is reciprocally disposed within cylinder housing 64. Cylinder housing 64 defines a variable volume first chamber 70 on a side of head 68 opposite from ram 66. Cylinder housing 64 also defines a variable volume second chamber 72 on a side of head 68 which is adjacent to ram 66. Second hydraulic cylinder 38 includes a first end 74 coupled with a flange 76 extending from frame member 24 at distal end 26, and a second end 78 coupled with a flange 80 extending from cutter head 16 (FIGS. 2 and 3).

First fluid line 40 fluidly interconnects first chamber 47 in first hydraulic cylinder 34 with first chamber 70 in second hydraulic cylinder 38. Second fluid line 42 fluidly interconnects second chamber 49 in first hydraulic cylinder 34 with second chamber 72 in second hydraulic cylinder 38. An electrically operated valve 82 is interposed in second fluid line 42. In the closed position, valve 82 prevents fluid flow between second chamber 49 of first hydraulic 34 and second chamber 72 of second hydraulic cylinder 38. Valve 82 may also be manually operable (such as through a solenoid valve, etc.), but is preferably electrically controlled based upon an operating position of cutter head 16. For example, cutter head 16 is movable between a transport position (as shown in FIG. 1), a working position, and a raised field position. Valve 82 is closed when cutter head 16 is in the transport position or raised field position to lock the position of cutter head 16 relative to frame member 24.

During operation, transport wheel 84 is removed from cutter head 16 and frame member 24 is pivoted relative to 3-point hitch assembly 22 until cutter head 16 is in a working position (generally perpendicular to the position shown in FIG. 1). Threaded bolt 62 is threaded into first end 56 of spring 36 until a desired preload is placed upon spring 36. This in turn exerts an axial tensile load on ram 46 which compresses the hydraulic fluid within second chamber 49 of first hydraulic cylinder 34. With valve 82 in the open position, the compressed fluid within second chamber 49 transmits fluid pressure to second chamber 72 of second hydraulic cylinder 38. This in turn applies an axial lifting force to ram 66 and flange 80 of cutter head 16. Applying a greater preload to spring 36 results in a greater lifting force to distal end 32 of cutter head 16. Conversely, applying a smaller preload to spring 36 results in less lifting force to distal end 32 of cutter head 16. In this manner, cutter head 16 can be balanced relative to pivot point 28. The application of a lifting force, as described, presumes that the part of the cutter head 16 outboard of the pivot connection 28 is heavier than the inboard part. If this is not the case, then a compression spring would be used instead of the tension spring 36, resulting in a pushing force being exerted by the pressure fluid acting on the head end of the piston 68 of the second hydraulic cylinder 38. Of course, another way to accomplish this result would be to retain the tension spring 36, but mount the second hydraulic cylinder 38 so that its rod end is coupled to the cutter head 16 to the left of the pivot connection 28, as viewed in FIG. 2.

While the spring 36 is operating to counterbalance the cutter head 16 about the pivot connection 28, the hydraulic cylinders 34 and 38 will operate to dampen any motion of the cutter head 16 about the pivotal connection 28 caused as the cutter head 16 moves over uneven terrain or obstacles.

As agricultural mower 10 approaches the end of a field, 3-point hitch assembly 22 and cutter head 16 are typically raised to a raised field position during a turning maneuver before traversing in an opposite direction across the field. The position of hitch assembly 22 relative to traction unit 14 can be sensed using an appropriate sensor and controller (not shown). The controller closes valve 82 based upon an input signal to prevent fluid flow between first hydraulic cylinder 34 and second hydraulic cylinder 38, thereby locking the position of cutter head 16 relative to frame member 24. Similarly, frame member 24 is pivoted to the position shown in FIG. 1 such that cutter head 16 is generally in line with traction unit 14 when cutter head 16 is in a transport position. The position of frame member 24 relative to 3-point hitch assembly 22 can be sensed using an appropriate sensor (not shown) and inputted to a controller. The controller again closes valve 82 so that the position of cutter head 16 relative to frame member 24 does not pivot during transport.

Having described the preferred embodiment, it will become apparent that various modifications can be made without departing from the scope of the invention as defined in the accompanying claims.

What is claimed is:

1. A hydraulic system, comprising:

a frame member having an end;

a structural member pivotally coupled with said frame member end;

a first hydraulic cylinder including a cylinder housing, a ram with a head reciprocally disposed within said housing, a first chamber on one side of said head, a second chamber on an other side of said head, a first end associated with one of said cylinder housing and said ram, a second end associated with an other of said cylinder housing and said ram, said first end of said first hydraulic cylinder being attached to said frame member;

a preload spring having a first end and a second end, said spring first end being attached to said frame member, said spring second end being attached to one of said structural member and said second end of said first hydraulic cylinder;

a second hydraulic cylinder coupled between said frame member and said structural member, said second hydraulic cylinder including a cylinder housing, a ram with a head reciprocally disposed within said housing, a first chamber on one side of said head, and a second chamber on an other side of said head;

a first fluid line interconnecting said first chamber of said first hydraulic cylinder and said first chamber of said second hydraulic cylinder;

a second fluid line interconnecting said second chamber of said first hydraulic cylinder and said second chamber of said second hydraulic cylinder; and a valve interposed in one of said first fluid line and said second fluid line.

2. The hydraulic system of claim 1, wherein said valve is an electrically operated valve.

3. The hydraulic system of claim 1, wherein said valve is interposed in said second fluid line, and wherein said second chamber of said first hydraulic cylinder is adjacent said ram in said first hydraulic cylinder, and said second chamber of said second hydraulic cylinder is adjacent said ram in said second hydraulic cylinder.

4. The hydraulic system of claim 1, further including an adjustable preload member coupled with said spring first end.

5. The hydraulic system of claim 4, wherein said preload member comprises a threaded bolt.

6. The hydraulic system of claim 4, wherein said preload member is mechanically adjustable.

7. The hydraulic system of claim 1, wherein said frame member includes spaced apart flanges extending outwardly therefrom, said first end of said first hydraulic cylinder being attached to one of said flanges and said spring first end being attached to an other of said flanges.

8. A method of operating a hydraulic system, comprising the steps of:

providing a first hydraulic cylinder including a cylinder housing, a ram with a head reciprocally disposed within said housing, a first chamber on a side of said head opposite said ram, a second chamber on a side of said head adjacent said ram, a first end associated with said cylinder housing, and a second end associated with said ram;

providing a second hydraulic cylinder including a cylinder housing, a ram with a head reciprocally disposed within said housing, a first chamber on a side of said head opposite said ram, and a second chamber on a side of said head adjacent said ram;

interconnecting a first fluid line between said first chamber of said first hydraulic cylinder and said first chamber of said second hydraulic cylinder;

interconnecting a second fluid line between said second chamber of said first hydraulic cylinder and said second chamber of said second hydraulic cylinder;

attaching a preload spring to said second end of said first hydraulic cylinder;

adjusting a preload on said second end of said first hydraulic cylinder using said preload spring; and positioning a valve in one of said first fluid line and said second fluid line.

9. The method of claim 8, including the step of electrically operating said valve.

10. The method of claim 9, including the step of attaching said first end of said first hydraulic cylinder to a frame member, said electrically operating step being carried out dependent upon a position of said frame member.

11. An agricultural mower, comprising:

a frame member having an end;

a cutter head pivotally coupled with said frame member end;

a first hydraulic cylinder including a cylinder housing, a ram with a head reciprocally disposed within said housing, a first chamber on one side of said head, a second chamber on an other side of said head, a first end associated with one of said cylinder housing and said ram, a second end associated with an other of said cylinder housing and said ram, said first end of said first hydraulic cylinder being attached to said frame member;

a preload spring having a first end and a second end, said spring first end being attached to said frame member, said spring second end being attached to one of said structural member and said second end of said first hydraulic cylinder;

a second hydraulic cylinder coupled between said frame member and said cutter head, said second hydraulic cylinder including a cylinder housing, a ram with a head reciprocally disposed within said housing, a first chamber on one side of said head, and a second chamber on an other side of said head;

a first fluid line interconnecting said first chamber of said first hydraulic cylinder and said first chamber of said second hydraulic cylinder;

a second fluid line interconnecting said second chamber of said first hydraulic cylinder and said second chamber of said second hydraulic cylinder; and a valve interposed in one of said first fluid line and said second fluid line.

12. The agricultural mower of claim 11, said cutter head being movable between a working position, a raised field position and a transport position, said valve being operable dependent upon said position of said cutter head.

13. The agricultural mower of claim 12, wherein said valve is an electrically operated valve.

14. The agricultural mower of claim 12, wherein said valve is interposed in said second fluid line, and wherein said second chamber of said first hydraulic cylinder is adjacent said ram in said first hydraulic cylinder, and said second chamber of said second hydraulic cylinder is adjacent said ram in said second hydraulic cylinder.

15. The agricultural mower of claim 11, further including an adjustable preload member coupled with said spring first end.

16. The agricultural mower of claim 15, wherein said preload member comprises a threaded bolt.

17. The agricultural mower of claim 15, wherein said preload member is mechanically adjustable.

18. An agricultural mower, comprising:
- a frame member having an end, said frame member including spaced apart flanges extending outwardly therefrom;
- a cutter head pivotally coupled with said frame member end;
- a first hydraulic cylinder including a cylinder housing, a ram with a head reciprocally disposed within said housing, a first chamber on one side of said head, a second chamber on an other side of said head, a first end associated with one of said cylinder housing and said ram, a second end associated with an other of said cylinder housing and said ram, said first end of said first hydraulic cylinder being attached to said frame member;
- a preload spring having a first end and a second end, said spring first end being attached to said frame member, said spring second end being attached to one of said structural member and said second end of said first hydraulic cylinder, said first end of said first hydraulic cylinder being attached to one of said flanges and said spring first end being attached to an other of said flanges;
- a second hydraulic cylinder coupled between said frame member and said cutter head, said second hydraulic cylinder including a cylinder housing, a ram with a head reciprocally disposed within said housing, a first chamber on one side of said head, and a second chamber on an other side of said head;
- a first fluid line interconnecting said first chamber of said first hydraulic cylinder and said first chamber of said second hydraulic cylinder; and
- a second fluid line interconnecting said second chamber of said first hydraulic cylinder and said second chamber of said second hydraulic cylinder.

19. The agricultural mower of claim 11, wherein said frame member comprises a cantilever beam.

* * * * *